May 23, 1933.     P. M. RAINEY     1,910,053
LUBRICATING SYSTEM
Filed April 27, 1929
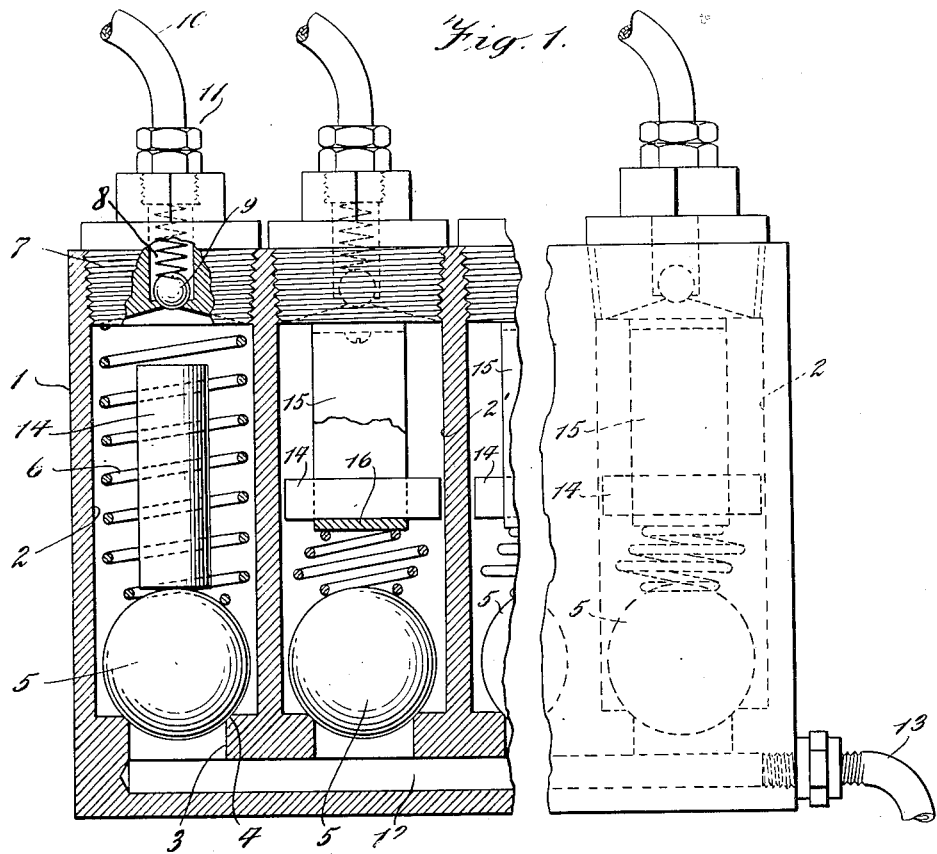
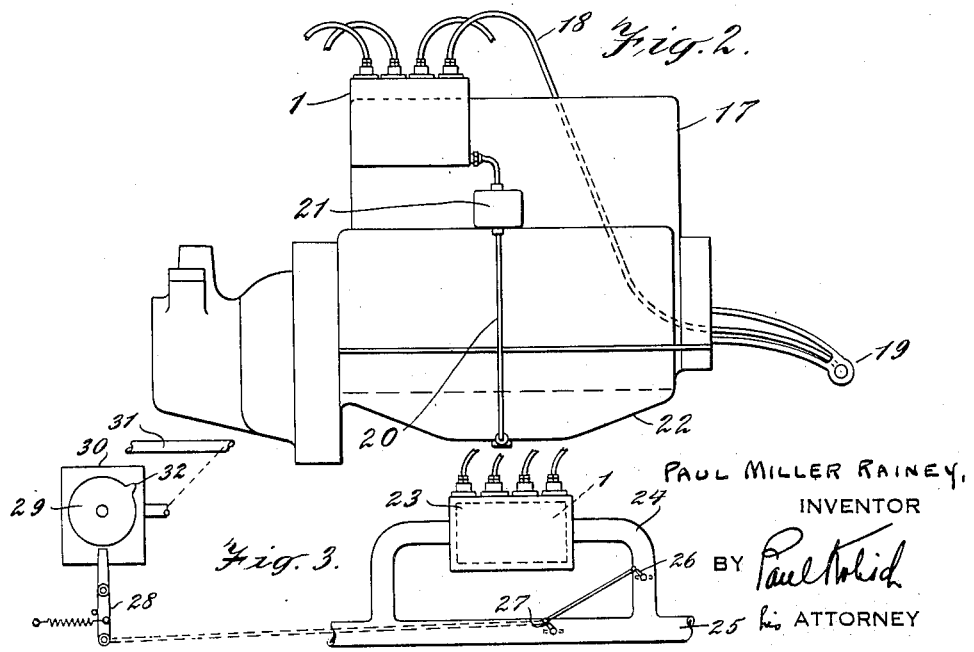
PAUL MILLER RAINEY,
INVENTOR
BY Paul Kolich
his ATTORNEY Patented May 23, 1933

1,910,053

UNITED STATES PATENT OFFICE

PAUL MILLER RAINEY, OF MONTCLAIR, NEW JERSEY, ASSIGNOR TO COMBINATION SELECTOR COMPANY, INCORPORATED, OF MONTCLAIR, NEW JERSEY, A CORPORATION OF NEW JERSEY

LUBRICATING SYSTEM

Application filed April 27, 1929. Serial No. 358,628.

This invention relates to automatic lubricating devices.

It is an object of the present invention to provide a lubricating system wherein the thermal expansion of heated oil is utilized to distribute the oil to the bearings which it is desired to lubricate.

Another object is to provide an automatic lubricating system which is adapted to supply lubricant under pressure to any desired number of oiling points wherein each bearing receives its lubricant under a given pressure entirely independent of the pressure which is applied to the other bearings of the system.

More specifically it is an object of this invention to provide a closed chamber or series of chambers filled with lubricating oil provided with proper valves and positioned so as to be subjected to cycles of heating and cooling resulting from the operation of the engine or other device to which this system is applied.

In accordance with my invention, I provide a series of oil pumping chambers having inlet and outlet check valves and conduits for connecting respectively each inlet valve with a supply of oil, and each outlet valve with a bearing to be lubricated. These oil chambers, when the device is used in an automobile, are so positioned as to be subjected to heat incidental to the operation of the engine. They may be placed beside the engine block or arranged so as to be heated by radiator water, engine lubricating oil, or exhaust gases. One or several groups of chambers may be used as desired. For example, several units may be located at spaced points on the machine frame in such manner as to simplify piping of oil to the bearings. As the engine is started, its temperature rises, heating the oil in the chambers and causing it to expand, thereby opening the outlet check valves, causing oil to be forced through the conduits to the bearings to be lubricated. When the engine is stopped and allowed to cool the oil in the chambers contracts, thereby creating a partial vacuum which opens the inlet check valve, the outlet valve being closed, thereby drawing a fresh charge from the oil reservoir into each of the chambers, which are then ready for another cycle of operation.

In order to insure dependable operation of the pumping chambers I prefer to utilize an inlet valve having a relatively large area. When this valve is of the ball type the seat is preferably made narrow so that there will be less liability of dirt preventing sealing of the valve, and a spring may be provided for holding the valve more firmly on its seat in order to insure that no leakage will occur. The strength of the spring and/or weight of the valve should be so proportioned relative to the active area of the valve that during the cooling of the oil the valve will open under atmospheric pressure to admit a fresh supply of oil.

Any number of lubricating units may be used as desired. Where more than one chamber is needed it may be found more economical to make all of the chambers of the same volume. If it is desired to regulate the amount of oil forced from each chamber during a heating cycle this may be done by placing within the chamber a piece of material, such as, for example, a bar of metal, having a coefficient of expansion less than that of the oil. In this manner the effective volume of the chamber will be reduced thereby causing less oil to be ejected during a cycle. Alternatively, the chambers may be made of different sizes in order that the desired amount of oil may be fed to each bearing.

Another feature of my invention relates to a system of the character just described wherein lubrication of the bearings is arranged to occur at definite spaced intervals independently of the time interval between regular heating and cooling cycles of the engine. I provide a mechanism which serves to direct heat around the pumping chamber mechanism at given spaced intervals to cause the lubricating cycle to occur. On an automobile this may be done by providing a cam device operated by a gear reduction mechanism driven by the automobile propeller, crank, or cam shaft, which every predetermined number of traveled miles, or revolutions, serves to deflect heat from the exhaust pipe or other part of the engine around the chambers to heat them for a sufficient period of time to cause the expansion of oil necessary to give the desired lubrication.

The above mentioned and other objects and advantages will be made clear in the following description and accompanying drawing.

In the drawing Fig. 1 shows in side elevation and partly in section a lubricating device constructed in accordance with my invention.

Fig. 2 shows such a device positioned on an automobile engine.

Fig. 3 illustrates a system wherein automatic lubrication in secured at predetermined spaced intervals.

Referring more particularly to the drawing, reference numeral 1 indicates a block of material such as cast-iron or the like having a plurality of cylindrical chambers 2 therein. Each of these chambers has a portion of reduced diameter 3 which serves as a fluid opening. The upper portion 4 forms a valve seat which cooperates with a valve 5 shown in its a ball. For holding the valve 5 firmly on its seat a compression spring 6 is provided. In some cases this spring may not be necessary as the weight of the valve would be sufficient to keep it closed. This spring presses against the top side of the ball and at the other end abuts against a plug 7 which is threaded into the upper end of the chamber 2 and provided with a duct 8. This duct 8 serves as an outlet opening for the oil in the chamber and is provided with an outgoing check valve 9. A pipe 10 is arranged to conduct oil to a bearing and is connected with the plug 7 by any suitable means such as a coupling 11. All of the inlets 3 of the various chambers 2 are interconnected with a common inlet header 12 which communicates through a pipe 13 with a suitable source of oil supply.

A body 14 of metal or other material may be provided in the chambers for the purpose of varying the amount of oil ejected therefrom during a heating cycle. In order to reduce the amount of oil ejected the coefficient of thermal expansion of the body 14 should be less than that of the oil in the chamber.

In the cylinder 2′ the spring 6 is shown as positioned between the valve 5 and a spacing member 15 attached to the plug 7. The bottom 16 of the member 15 may serve as a shelf for supporting the body 14 in order to keep the weight of the body off the valve 5.

While I have shown the valves 5 and 9 as ball valves, it will be understood that any other suitable valve such as the mushroom or poppet type might be used as well.

The petroleum oil ordinarily used for lubricating bearings has a much higher thermal coefficient of expansion than that of ordinary metals or other materials, and hence no particular attention need be paid to the block 1 from an expansion viewpoint. It is, of course, preferable to select material for the block which will have a small coefficient of expansion so that the difference in volumetric expansions of the block and the lubricating oil will be as great as possible. If the fluid to be fed from the chamber 2 has a coefficient of expansion which is low, care should be taken to select a material for the block which has a still lower coefficient. Should it be desired to feed from the chamber a fluid which has an extremely small coefficient, operation may be secured by utilizing for the block 1 a material having a greater coefficient, in which case the fluid will be drawn into the chamber during the heating portion of the cycle and rejected during the cooling portion.

In Fig. 2 the block 1 is indicated as fastened to the side of an automobile engine 17 and a pipe 18 indicated as leading to a bearing 19. The supply of lubricating oil is secured from the engine crankcase 22 through an intake line 20. A filter 21 may be placed in the intake line in order to purify the oil passing to the chambers. This filter may be of the ordinary wool packed type wherein filtering is secured by passage of the oil through wool packing. Instead of utilizing the crankcase 22 as a source of oil supply a separate oil reservoir may be provided.

In order to save space and save piping the block 1 may be attached to the engine crankcase or the individual oil chambers 2 may be formed integrally with the crankcase.

In order to insure against continuous siphoning of oil from the reservoir to the bearings, if the spring of outlet valve 9 is weak, the system may be so arranged that the oil supply level will be below the bearings. For example, as indicated in Fig. 2, the bearing 19 is located at a level higher than that in the crankcase 22. However, if it is necessary that the oil supply be higher than the level of the bearings the compression of the springs on one or both of the valves and the weight of the valves in the chamber 2 may be so proportioned that siphoning will not occur. The compression of the spring 6 should be great enough to prevent siphoning and still small enough to insure opening of the valve under the relatively great suction created by the contracting of the oil in the chamber during cooling.

I prefer to mount the block 1 so as to receive heat directly from the engine 17, but a different arrangement may be made if desirable so that heat will be received from the engine cooling water or from the exhaust gases.

Where the block 1 is arranged to be heated by exhaust gases from the engine, a greater number of heating and cooling cycles may be obtained than is necessary for the reason that when the engine is laboring under a heavy load the temperature of the exhaust gas will rise, thereby causing the bearings to be oiled at irregular intervals during the operation of the engine, dependent upon the variation and load conditions thereof. By mounting the block adjacent to the engine proper the lubricant will be forced to the bearings only during one complete heating and cooling cycle resulting from starting and stopping the engine, independently of any slight variations that might result from a change in load conditions, as the heat inertia of the engine is much greater than that of the exhaust pipe.

Fig. 3 shows a modified form of system wherein the block 1 is arranged to be heated by exhaust gases. The block is located in a housing 23 connected by means of a by-pass 24 with a main exhaust pipe 25. A pair of valves 26 and 27 are linked together and connected to a finger 28 adapted to be rocked at intervals by a cam 29, so as to shut the valve 27 and open the valve 26, thereby causing hot gases to circulate through the housing 23 around the block 1. The cam may be rotated through a suitable gear reduction mechanism 30 attached to the automobile propeller shaft 31 or other moving part. During each revolution of the cam 29 a projection 32 thereon engages the finger 28 for a short interval of time causing the operation of the valves. This arrangement insures periodic lubrication of any desired number of bearings substantially independently of the heating and cooling periods of the engine.

I have illustrated my system as applied to an automobile but it should be understood that it is applicable to any mechanism wherein heating and cooling cycles are obtained, or to any mechanism where heating and cooling cycles are found nearby.

It will be obvious to those skilled in the art that the invention is capable of a wide variety of modifications and adaptations, and that the present disclosure is intended merely to illustrate its nature without limiting its scope, which is defined in the appended claims.

What I claim is:

1. In an automatic lubricating system, a block of material, a plurality of chambers in said block, said chambers terminating at one end in a common header and being provided at the other end with individual closures, a check valve for closing the opening between each individual chamber and the header and means for heating said block.

2. In a thermal fluid pressure device, a vertical hollow chamber having an opening at the lower end thereof, a narrow valve seat for said opening, a relatively large ball valve cooperating with said seat and a compression spring for forcing said ball against said seat, the force of said spring plus the weight of the ball being less than the atmospheric pressure exerted on the portion of the ball exposed to said opening, an opening at the other end of said chamber, and a check valve in the last mentioned opening.

3. In an automatic lubricating system, a block of material, a plurality of hollow chambers in said block, a header connecting with one end of each chamber, check valves for interrupting communication between the header and each chamber, a perforated closure for the other end of each chamber, a fluid conduit leading from said perforation to a bearing an oil supply connection for said header and means for heating said block.

4. A device in accordance with claim 3 wherein means responsive to a predetermined number of revolutions of the automobile propeller shaft is provided for subjecting the block to a heating cycle.

In testimony whereof, I have signed my name to this specification, this 11th day of April, 1929.

PAUL MILLER RAINEY.